Oct. 2, 1951  J. V. BERTRAND ET AL  2,569,919
HIGH-FREQUENCY DIELECTRIC HEATING
Filed Sept. 20, 1946 7 Sheets-Sheet 1

INVENTORS
JOSEPH V. BERTRAND
GEORGE S. SHAW
BY
Hammond & Littell
ATTORNEYS

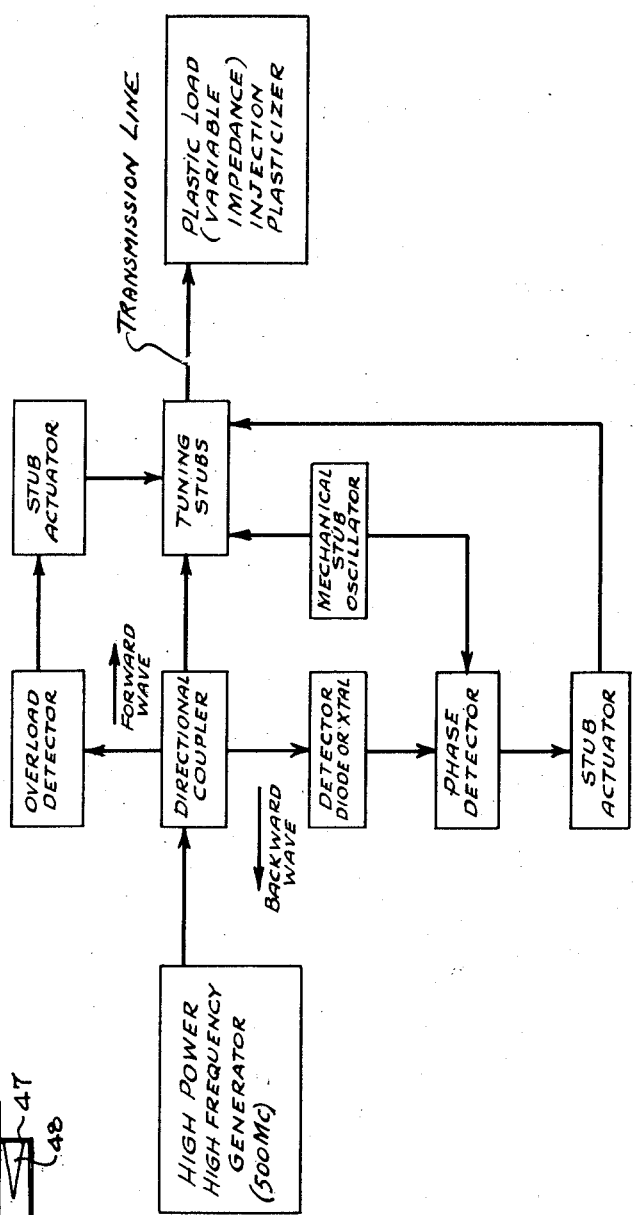
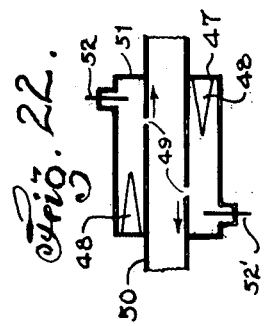

Oct. 2, 1951    J. V. BERTRAND ET AL    2,569,919
HIGH-FREQUENCY DIELECTRIC HEATING
Filed Sept. 20, 1946    7 Sheets-Sheet 4
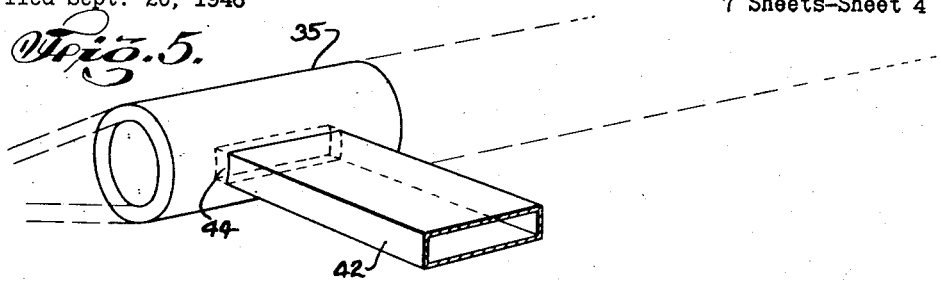
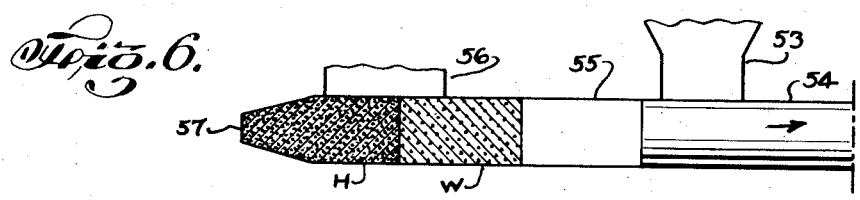
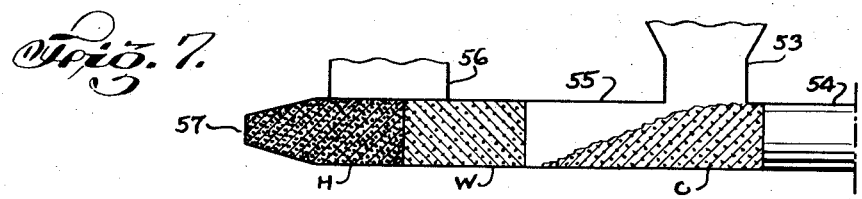
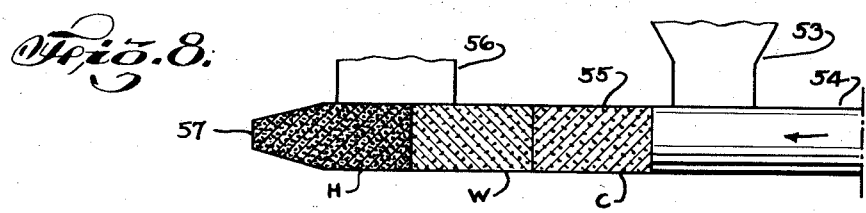
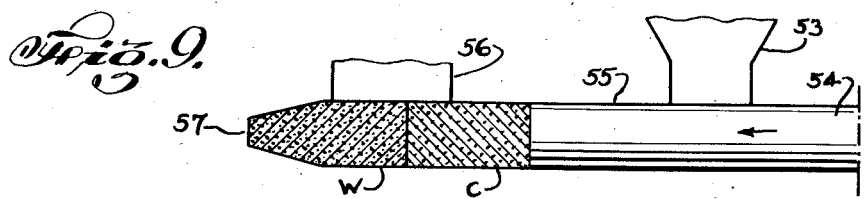
INVENTOR
JOSEPH V. BERTRAND
GEORGE S. SHAW
BY
Hammond & Littell
ATTORNEYS Oct. 2, 1951 J. V. BERTRAND ET AL 2,569,919
HIGH-FREQUENCY DIELECTRIC HEATING
Filed Sept. 20, 1946 7 Sheets-Sheet 5

INVENTORS
JOSEPH V. BERTRAND
GEORGE S. SHAW
BY
Hammond & Littell
ATTORNEYS

INVENTORS
JOSEPH V. BERTRAND
GEORGE S. SHAW
BY
Hammond & Littell
ATTORNEYS

Oct. 2, 1951     J. V. BERTRAND ET AL     2,569,919
HIGH-FREQUENCY DIELECTRIC HEATING
Filed Sept. 20, 1946     7 Sheets-Sheet 7

INVENTORS
JOSEPH V. BERTRAND
GEORGE S. SHAW
BY
Hammond & Littell
ATTORNEYS

Patented Oct. 2, 1951

2,569,919

UNITED STATES PATENT OFFICE 2,569,919

HIGH-FREQUENCY DIELECTRIC HEATING

Joseph V. Bertrand, Brooklyn, N. Y., and George S. Shaw, Greenwich, Conn., assignors to Hydropress, Incorporated, New York, N. Y., a corporation of Delaware Application September 20, 1946, Serial No. 698,242

6 Claims. (Cl. 18—30)

This invention relates to dielectric or electrostatic heating of plastics and particularly to a machine and method for heating the plastic at high frequencies in conjunction with injection molding machines.

In the shaping of plastics of the thermosetting or thermoplastic variety, heat must be applied thereto and the present plastic injection molding machines are limited in their capacity principally because of the heating means wherein the plastic cannot be heated uniformly throughout in the minimum time desired.

One of the objects of the present invention is to provide a method and apparatus wherein relatively large masses of a plastic may be heated previous to molding or other shaping operations. Other shaping operations are to be understood to include extrusion, compression molding, or any operation wherein a plastic material is to be heated.

Another of the objects of the invention is to provide various improved cycles of operation for dielectrically heating plastic for injection molding machines. An injection molding machine should be arranged so that the plastic will be heated in such a manner as not to stick on the end or around the injection plunger. One of the features of the invention is to arrange the cycle so that there is always a zone of cool or warm plastic between the injection plunger and the hot plastic to be injected or shaped.

Another of the objects of the present invention is to provide a control means for the heating operation and energy transfer apparatus which will insure maximum transfer of power to the load by properly matching the impedance of the load and generator at all times throughout the heating cycle.

Still another object of the invention is to provide an improved manner of controlling the flow of high frequency energy to the wave guide heating chamber without it being necessary to shut off the high frequency generator and to direct energy into the feed hopper for preheating purposes.

These and other objects, features, and advantages of the invention will become apparent from the following description and drawings which are merely exemplary.

In the drawings:

Fig. 3 is a block diagram showing one control system for heating of the plastic and matching the impedance of the load and the generator.

Fig. 5 is a fragmentary isometric view of one form of wave guide heating chamber and transmission line wave guide entering the side thereof.

Figs. 6 to 9, inclusive, show four steps in one method of operation of an injection molding machine employing the invention.

Figure 10:
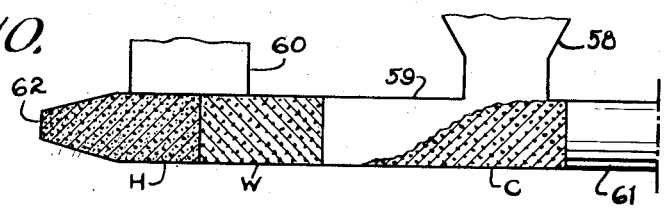
Figure 11:
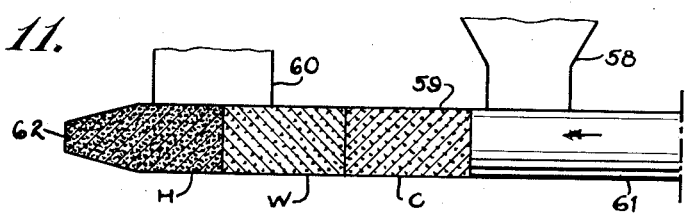
Figure 12:
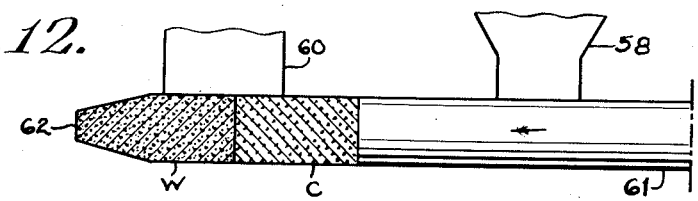

Figs. 10 to 12, inclusive, show another series of steps in a method of operation employing the present invention.

Figs. 13 to 16, inclusive, show still another method of operation of the invention.

Figs. 17 to 20, inclusive, show a further manner in which the invention may be performed.

Figure 21:
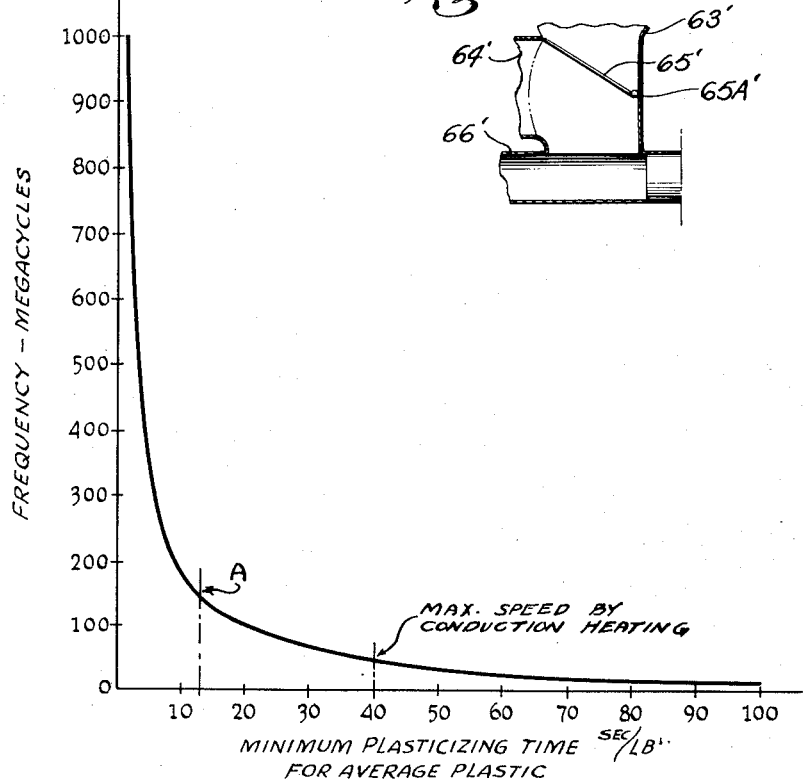

Fig. 21 is a graph showing the relation between frequency and the minimum plasticizing time for the average plastic.

Figure 4:
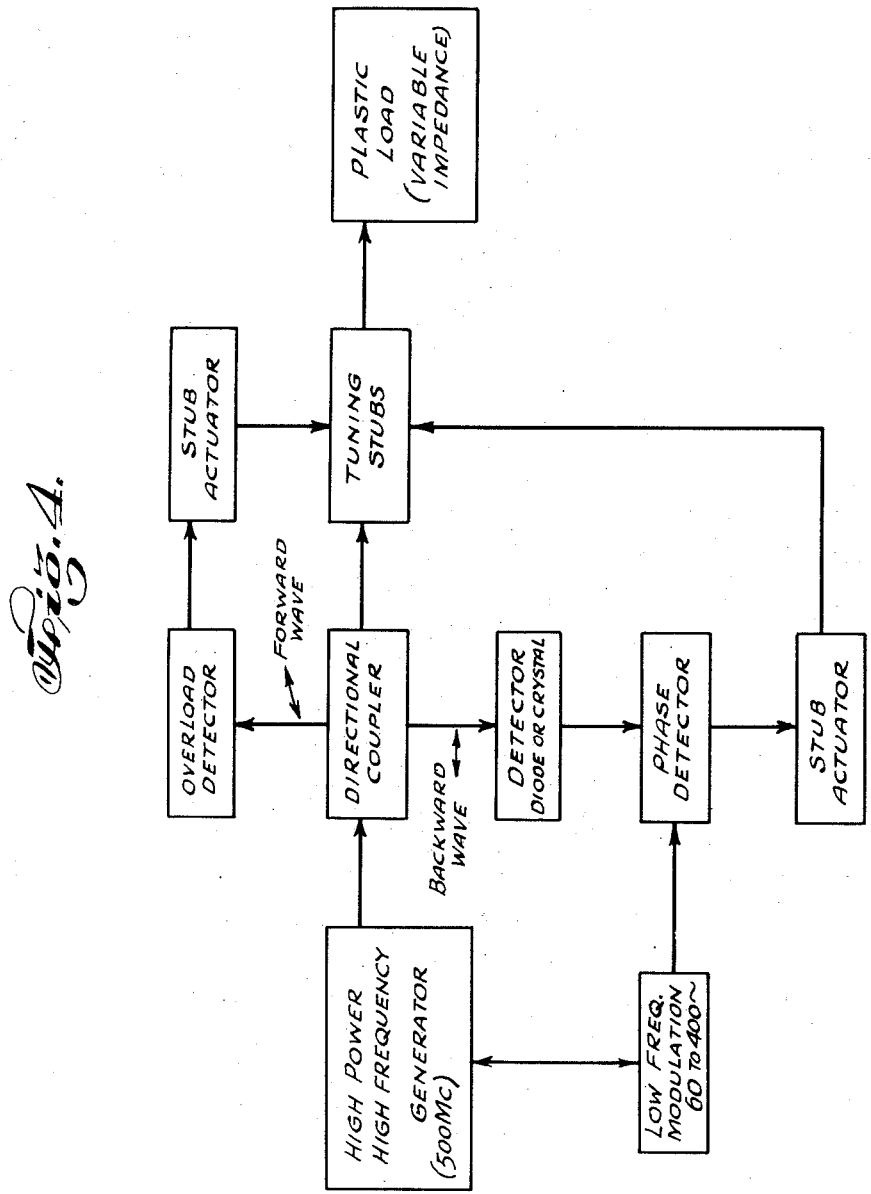
Fig. 4 shows another type of control means for the heating of the plastic and matching of the impedance of the load and the generator.

Fig. 22 is a fragmentary sectional view illustrating a directional coupler such as used in Figs. 3 and 4.

Figure 23:
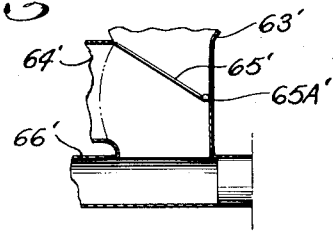

Fig. 23 is a schematic view of a modified form of valve arrangement.

Figure 1:
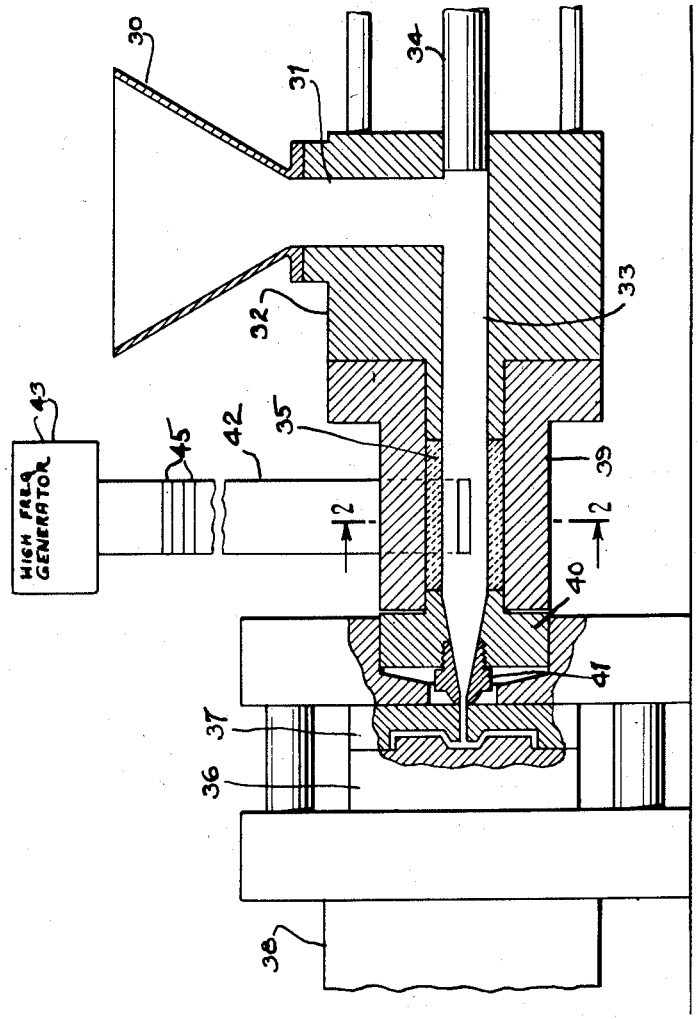
Fig. 1 is a fragmentary elevation partially in section of an injection molding machine employing the present invention.

Referring to Fig. 1, 30 is a hopper through which plastic may be fed to an injection molding machine, said hopper leading to a passage 31 in the main frame 32 of the machine. Passage 31 may have suitable gates (not shown) or control means for controlling the flow of plastic to the bore 33. Plunger 34 is reciprocable in a conventional manner in bore 33 and the wave guide heating chamber 35 so that plastic may be moved into the heating chamber and after being heated therein transferred to molds 36 and 37, said molds being held in a closed position by ram 38 as is known in the art. The heating chamber support 39 may have injection nozzle holder 40 fastened thereto, injection nozzle 41 being screw threadedly or otherwise engaged with the nozzle holder 40. Transmission line wave guide 42 is connected to a suitable high frequency generator 43, the generator 43 being preferably one operating at a frequency of over 150 megacycles per second and may, for example, be of the type known as a "Resnatron" described in the Proceedings, I. R. E., April, 1946, page 169W. Since "Resnatron" tubes may operate at 500 megacycles per second and have a capacity of delivering power up to 50 kilowatts per tube.

The maximum speed of heating attainable by the use of conduction heating of plastics now presently employed is about 40 seconds per pound for the average plastic material and is indicated in the curve of Fig. 21. In order to operate economically, the dielectric heating method should be approximately one-third faster than conduction heating so that the line A indicates the speed desirable for dielectric heating which it can be seen requires over 150 megacycles per second.

In order to heat large masses of plastic, considerable power is necessary and the voltage usable is limited by the voltage break-down characteristics of the plastic. This means that the only way to absorb higher power after the voltage limit is reached, is to effectively lower the impedance of the load which must be done by increasing the frequency of the generator.

Figure 2:
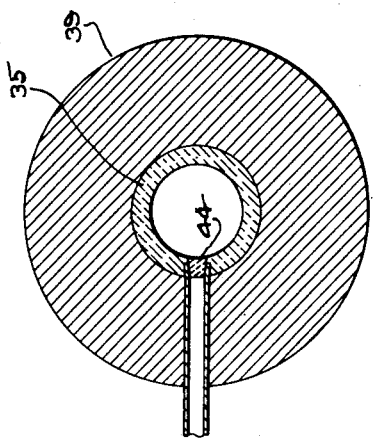
Fig. 2 is a section taken along the line 2—2 of Fig. 1 showing the heating chamber and transmission line wave guide.

As the frequency is increased, the electrode length becomes a large portion of the wave length so that when this occurs, the ordinary two electrode dielectric heating method is not satisfactory so that it is necessary to use a hollow pipe type wave guide heating chamber composed of a hollow chamber such as a hollow cylindrical body or a hollow rectangular body. The dimension of the guide must be chosen for the particular frequency involved so that there will be proper propagation of waves therein. If the guide is too small for the frequency chosen, cut-off occurs, and, if it is too big, there may be excitation in more than one mode as is known in the art. As an example of a suitable cylinder for 500 megacycles per second, the length can be twenty-four inches and the diameter can be between 8 to 12 inches. The transmission line leading from the high frequency generator to the wave cylinder may enter through a window 44 (Figs. 2 and 5). Window 44 may be made wider at the inner face of the cylinder than it is at the outer face so as to resist the pressure of material within the cylinder 35. It is apparent that the window may be made of some suitable low dielectric loss material. Such a wave guide heating chamber may be made of any suitable metal and the surface can have a hard abrasion resistant metal surface.

As has been mentioned, the impedance of the plastic material changes as heating progresses and thus it is necessary to control high frequency transmission in the transmission wave guide so that the impedance of the load and generator are matched during the entire heating cycle to provide maximum transfer of energy. The impedance of the load should be substantially the same as the high frequency generator. When the plastic impedance is substantially lower than that of the generator, currents beyond the desired and safe value may develop. When the plastic or load impedance is too high, a large part of the energy will be reflected rather than absorbed in the load which is obviously undesirable and also may damage the generator.

It is desirable to maintain a match between the generator and the plastic load until such a point is reached in the heating process that the impedance of the plastic load is so low as to seriously overload the high frequency generator. At such a point, the overload detector will control the stub actuator as discussed hereafter in such a manner as to create a mismatch between the generator and the load thus relieving the generator of the overload conditions.

One manner of doing this is shown in block diagram of Fig. 3, the tuning stubs used therein being indicated at 45 in Fig. 1. The block diagram of Fig. 3 shows a high frequency generator such as one operating at 500 megacycles per second connected through a directional coupler, the line having two tuning stubs connected therewith.

As is well known in the high frequency art, tuning stubs are extensions from the transmission line wave guide and can have movable end walls therein for the purpose of tuning the line by varying the effective length of the stub. Each of the stubs may be operated by a separate stub actuator of some suitable type as seen in the block diagram. If desired, a single stub may in some cases be used in place of the two or more stubs.

The high power high frequency generator is connected to a directional coupler of standard design. An illustrative form of coupler is shown in Fig. 22 wherein the transmission line 50 has boxes 51 and 47 mounted thereon with openings 49 from the transmission line into each of the boxes. Each box has a triangular strip 48 of some high loss material such as Bakelite or any other suitable reflection free load mounted therein and probes 52 and 52' extending into each of the boxes, box 51 and probe 52 being responsive to the forward wave, and box 47 and probe 52' being responsive to the backward wave. A connection from the forward wave probe 52 is made to an overload detector which in turn is connected to the stub actuator so as to prevent an overload on the transmission line. A mechanical stub oscillator is provided in conjunction with the backward wave tuning stub so as to continually move the stub preferably in a sinusoidal oscillation to provide a sensing movement thereof. A signal from said mechanical stub oscillator is fed to a phase detector and the signal from the backward wave probe 52' is fed to a detector which may be a diode or crystal and the rectified signal connected to said phase detector. In this manner, one side of the wave is fed to the phase detector in conjunction with the signal from the mechanical stub oscillator and the combined signal from the phase detector is used to operate the backward wave stub actuator to move the tuning stub so as to correct any mismatching between the high frequency generator and the plastic load in the heating chamber which occurs as the plastic becomes heated and the loss factor thereof changes. As is well known, the loss factor is the product of the dielectric constant times the power factor.

An alternate manner of controlling the impedance is seen in the block diagram of Fig. 4 wherein the high power high frequency generator is connected to a directional coupler which in turn is connected through the transmission line to the tuning stubs and the plastic load. The forward wave signal from the directional coupler feeds into an overload detector which in turn operates its stub actuator.

For the backward wave, a low frequency modulation source is connected to the high frequency generator and a signal therefrom also is connected to the phase detector, the directional coupler signal from the backward wave also being impressed on the detector. A rectified signal from the detector is combined in the phase detector with the signal from the low frequency modulation system to operate the backward wave stub actuator.

By means of the control systems of Figs. 3 and 4, the plastic load will be kept continually matched to the high frequency generator so as to insure the maximum transfer of energy in the system at all times and also will be mismatched near the end of the heating operation. It is apparent that other methods of control may be used to compensate for the change of loss factor in the plastic load as it becomes heated such as by a cam operator (not shown) for the stub actuator, the cam being generated in accordance with the characteristics of the plastic load and mechanically connected to the tuning stubs.

As an example of one system of operation, reference may be made to Figs. 6 to 9, inclusive, wherein the hopper is diagrammatically seen at 53 and an injection plunger at 54. The injection passage is shown in outline form at 55 and the wave guide schematically at 56 with the injection nozzle at 57. In Fig. 6, the plunger is being retracted and the current is turned on in the wave guide 56 so that zone H, which has been previously heated to a warm condition and moved to the injection nozzle, is raised to injection or highly heated condition. Plastic W which has just been moved to position by plunger 54, is brought to a warm condition. In Fig. 7, the loose plastic has been fed through hopper 53 and is in a cold condition, with zone W being warm and zone H being hot, the current having been turned off as the new plastic is fed into the bore 55. In Fig. 8, the plunger 54 is making an injection stroke serving to first compact the cold plastic at C as the injection plunger 54 moves to the left. In Fig. 9, the hot portion H of Fig. 8 of the plastic is injected into the molds and the warm plastic W is moved to the tip of the nozzle and in position to be heated to injection molding temperature by wave guide 56. The current is turned on when the injection plunger is retracted as seen in Fig. 6. In this arrangement, the plunger is not in contact with highly heated plastic material at any time and there are three zones of plastic of different temperatures during the injection process itself, as seen in Fig. 8. The boundary of the temperature difference between the zones is not necessarily as sharp as indicated in the drawings and the temperature difference is understood to be relative.

A different method of operation is seen in Figs. 10 to 12, inclusive, wherein hopper 58 is provided for the purpose of feeding cold plastic granules C to bore 59, said bore having a wave guide 60 as previously described connected therewith. The bore 59 is shown diagrammatically and has injection plunger 61 reciprocable therein. In Fig. 10, the current is off and the cold plastic C has just been fed into bore 59. From the previous operation, the plastic material next to the injection nozzle 62 is in a hot condition and the material to the right in a warm condition. The plunger advances to the left in Fig. 11 and closes the hopper to compact the cold plastic against the W or warm zone of plastic. The current at this time is turned on so as to complete the heating of the plastic adjacent the warm to its injection temperature. It is to be noted that this differs from the previous cycle of operation seen in Figs. 6 to 9, inclusive, wherein the current is turned on during the retraction of the plunger when there are only two zones of plastic adjacent the wave guide. The plunger 61 continues in its movement to the left in Fig. 12 and injects the outermost or hot zone of plastic into the mold through nozzle 62 thereby moving the warm plastic next to the injection nozzle and the cold plastic to the position shown in the wave guide heating chamber. The plunger is then reversed until it reaches the position in Fig. 10 and more cold plastic is fed in front of the plunger. In this case, the injection begins immediately after the heating takes place whereas in Figs. 6 to 9, the current is turned on as the plunger is retracting and is turned off so that heating is completed of the plastic adjacent the injection nozzle before the injection stroke starts.

Figure 13:
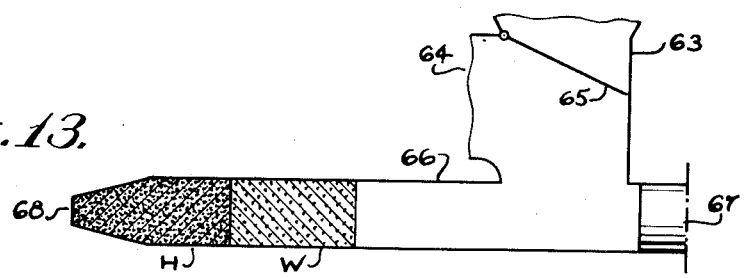
Figure 14:
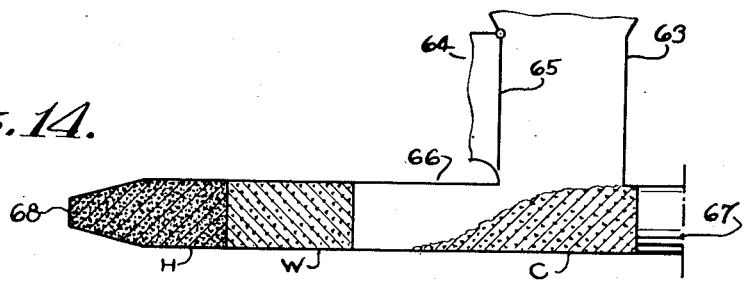
Figure 15:
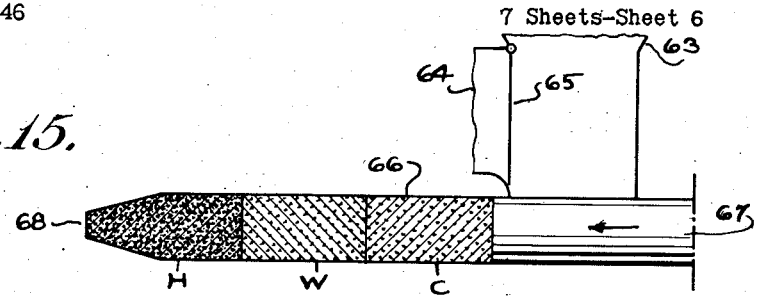
Figure 16:
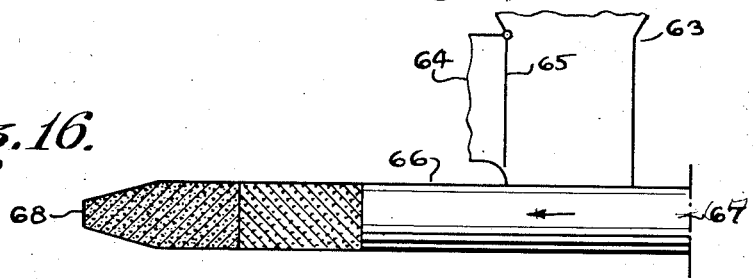
Figure 17:
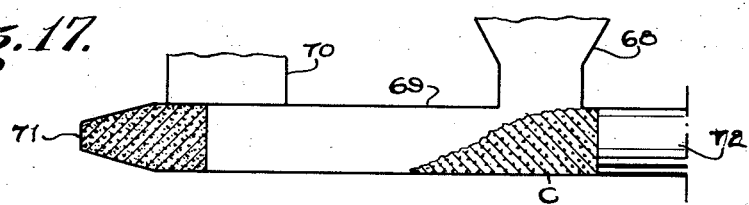
Figure 18:
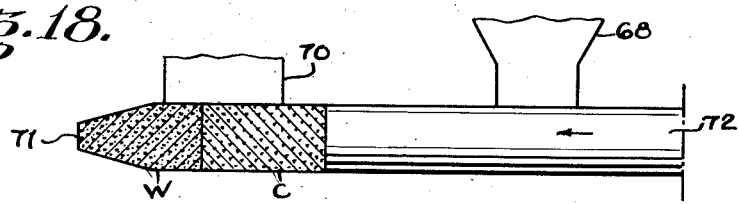
Figure 19:
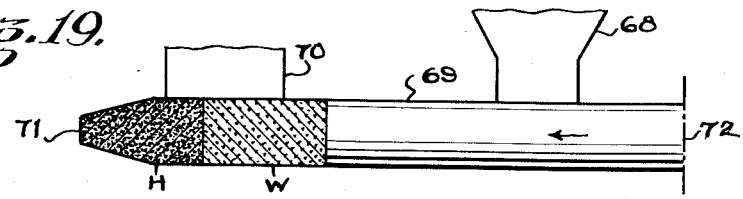

In Figs. 13 to 16, inclusive, hopper 63 joins the transmission wave guide feeder 64 so that the high frequency generator does not have to be cut-off and turned on each time. A flap valve plate 65 or other type of microwave control means is provided so as to shut off the flow of high frequency energy into the injection or heating chamber cylinder 66 at predetermined times. Such a control may be an ionized gas placed in front of the wave guide entrance. In Fig. 13, plate 65 is in position so that high frequency energy may enter the wave guide heating chamber 66 and heat the plastic H and W, H having previously been brought to a warm condition and at this time is brought to a hot or injection temperature. The plastic W is heated from a cold condition to a warm condition during the energization of the heating chamber. Plunger 67 is in a retracted position and when valve plate 65 is changed so that it covers the transmission wave guide feeder 64, cold plastic C will be fed into the bore of the heating chamber 66. The next operation is a movement of the injection plunger 67 to the left in Fig. 15 first compacting the cold plastic C and with continued movement of the plunger 67 (Fig. 16) injecting the hot plastic through the injection nozzle 68 into suitable molds. The valve plate or control means also may be reversed so that energy could be directed into the hopper for the purpose of preheating the plastic therein. Such is illustrated in Fig. 23 wherein valve 65' is pivoted at 65A' and is swingable to direct the energy to hopper 63' from wave guide 64', 66' being part of the heating chamber.

Figure 20:
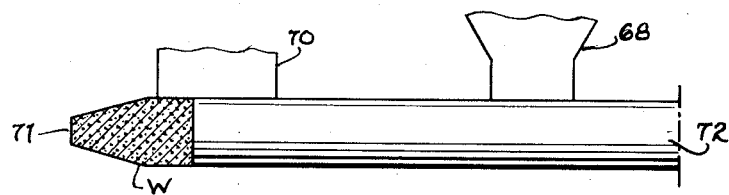

Still another method of operation may be seen in Figs. 17 to 20, inclusive, wherein only two zones of plastic, H and W are provided. Hopper 68 communicates as schematically shown with bore 69. Cold plastic C is fed in front of plunger 72 (Fig. 17) following which the plunger moves to the left and closes the hopper port bringing the cold plastic against the warm plastic W. The current is then turned on and the warm plastic heated to molding temperature as seen at H (Fig. 19), the cold plastic being heated to a warm condition. Further movement of the plunger 72 to the left will cause injection of the hot plastic into suitable molds (Fig. 20).

Because the various plastics have different loss factors and the necessity of matching the load impedance and generator, it is possible to compensate for the differences in various plastics by adding materials to the plastics to increase or change the loss factor thereof.

A ceramic low loss dielectric plunger can be used and the high frequency energy fed into the heating chamber wave guide such as is done in Figs. 13 to 16 so that the plunger does not shut off the energy to the heating chamber.

In place of the injection plunger illustrated it is evident that a feed screw or other feeding means may be used.

Reference is made to Patent No. 2,537,182 of January 9, 1951 to Bertrand and to Patent No. 2,537,193 of January 9, 1951 to Shaw for related subject matter.

By the present invention an improved apparatus and process is shown for heating plastic material dielectrically in a minimum of time. It is especially adapted for economic operation wherein large quantities are involved. It is to be understood that details of construction and arrangement of parts and steps may be made without departing from the scope of the invention as defined in the appended claims.

We claim:

1. In a device of the character described, the combination comprising a high frequency electrical generator, a heating chamber, and a wave guide means connecting said generator and chamber, including a directional coupler and tuning means connected to said coupler automatically matching the impedance of said generator and guide during heating of plastic in said guide as the impedance of said plastic changes during heating thereof.

2. In a device of the character described, the combination comprising a high frequency generator, a heating chamber, a transmission wave guide connecting said generator and heating chamber, a directional coupler in said guide, a pair of tuning stubs in said guide, an overload detector controlled by said coupler operating one of said tuning stubs, a mechanical stub oscillator oscillating the second stub, a phase detector connected to said coupler, said phase detector combining a signal from the coupler and said mechanical oscillator for controlling said second tuning stub to match the impedance of said generator and load during a heating operation.

3. In a device of the character described, the combination comprising a high frequency electrical generator, a heating chamber, a transmission line connecting said generator and heating chamber, a directional coupler in said line, a tuning stub in said line, an overload detector controlled by said coupler operating said tuning stub, a mechanical stub oscillator for oscillating the stub, a phase detector connected to said coupler, said phase detector combining a signal from the coupler and said mechanical oscillator for controlling said tuning stub to match the impedance of said generator and load during a heating operation.

4. In a device of the character described, the combination comprising a high frequency electrical generator, a heating chamber, a transmission line connecting said generator and heating chamber, a directional coupler in said line, a pair of tuning stubs in said line, an overload detector controlled by said coupler operating one of said tuning stubs, a source of low frequency modulating current connected to said generator, a phase detector having means connected with said coupler and modulating current for combining a signal therefrom, and means responsive to said combined signal for controlling the second tuning stub to automatically match the impedance.

5. In a device of the character described, the combination comprising a high frequency electrical generator, a heating chamber, a transmission wave guide connecting said generator and heating chamber, a directional coupler in said line, a tuning stub in said line, an overload detector controlled by said coupler operating said tuning stub, a source of low frequency modulating current connected to said generator, a phase detector having means connected with said coupler and modulating current for combining a signal therefrom, and means responsive to said combined signal for controlling the tuning stub.

6. In a molding machine, the combination including a feed hopper for feeding plastic material, a hollow tube heating chamber arranged to have standing waves therein when energized, a feed passage connected to said chamber and to said hopper, a source of high frequency electrical energy, a transmission wave guide connecting said source of energy, feed passage and hopper, and an energy arresting valve means selectively movable from a position directing high frequency energy into said hopper to a position blocking energy to the feed hopper and directing energy to said feed passage and chamber.

JOSEPH V. BERTRAND.
GEORGE S. SHAW.

REFERENCES CITED

The following references are of record in the file of this patent:

UNITED STATES PATENTS

| Number | Name | Date |
|---|---|---|
| 1,972,050 | Davis | Aug. 28, 1934 |
| 2,129,712 | Southworth | Sept. 13, 1938 |
| 2,151,157 | Schelkunoff | Mar. 21, 1939 |
| 2,197,122 | Bowen | Apr. 16, 1940 |
| 2,364,526 | Hansell | Dec. 5, 1944 |
| 2,370,883 | Smith | Mar. 6, 1945 |
| 2,386,966 | MacMillin | Oct. 16, 1945 |
| 2,398,606 | Wang | Apr. 16, 1946 |
| 2,422,189 | Fiske | June 17, 1947 |
| 2,427,094 | Evans | Sept. 9, 1947 |
| 2,427,100 | Kihn | Sept. 9, 1947 |
| 2,436,999 | MacMillin et al. | Mar. 2, 1948 |
| 2,438,914 | Hansen | Apr. 6, 1948 |

OTHER REFERENCES

"Electronic Torch," The Welding Engineer, December 1945, page 90. (Copy in Scientific Library.)